US 7,739,704 B2

(12) United States Patent
Wada et al.

(10) Patent No.: US 7,739,704 B2
(45) Date of Patent: Jun. 15, 2010

(54) DISK APPARATUS HAVING TRAVERSE AND SPINDLE CAM MEMBERS AND METHOD OF OPERATING SAME

(75) Inventors: Shinichi Wada, Ehime (JP); Koujiro Matsushita, Ehime (JP)

(73) Assignee: Panasonic Corporation, Osaka (JP)

( * ) Notice: Subject to any disclaimer, the term of this patent is extended or adjusted under 35 U.S.C. 154(b) by 975 days.

(21) Appl. No.: 10/585,248

(22) PCT Filed: Jul. 28, 2005

(86) PCT No.: PCT/JP2005/013830

§ 371 (c)(1),
(2), (4) Date: Jul. 5, 2006

(87) PCT Pub. No.: WO2006/027907

PCT Pub. Date: Mar. 16, 2006

(65) Prior Publication Data

US 2008/0301722 A1    Dec. 4, 2008

(30) Foreign Application Priority Data

Sep. 3, 2004    (JP)    ............................. 2004-257560

(51) Int. Cl.
*G11B 17/04* (2006.01)
*G11B 17/22* (2006.01)

(52) U.S. Cl. ...................................................... 720/695

(58) Field of Classification Search ................. 720/620, 720/619, 622, 652, 695, 697, 700
See application file for complete search history.

(56) References Cited

U.S. PATENT DOCUMENTS

| 5,684,776 | A  | * | 11/1997 | Davis et al. ................. 720/635 |
| 2002/0159373 | A1 | * | 10/2002 | Saji et al. .................... 369/77.1 |
| 2003/0012121 | A1 | * | 1/2003 | Kim ........................... 369/264 |

FOREIGN PATENT DOCUMENTS

| JP | 5-109171 | 4/1993 |
| JP | 2002-352498 | 12/2002 |

\* cited by examiner

*Primary Examiner*—Craig A. Renner
*Assistant Examiner*—Tamara Ashford
(74) *Attorney, Agent, or Firm*—Dickinson Wright PLLC

(57) ABSTRACT

A slot-in type disk apparatus includes: (1) a base body, (2) a traverse base provided on the base body, (3) a spindle motor held by the traverse base and rotating a disk, (4) a loading motor provided on the base body, (5) a traverse cam member for displacing a location of the traverse base with respect to the base body, and (6) a spindle cam member for displacing a location of the spindle motor with respect to the traverse base. The spindle motor is biased toward the traverse base by a resilient member. The disk is loaded on the disk apparatus and moved to a recording/replaying position, as a result of moving the traverse cam member and the spindle cam member correlatively in the horizontal direction by driving the loading motor and moving the traverse base and the spindle motor upward and downward.

6 Claims, 11 Drawing Sheets

DISK APPARATUS HAVING TRAVERSE AND SPINDLE CAM MEMBERS AND METHOD OF OPERATING SAME

TECHNICAL FIELD

The present invention relates to a disk apparatus for recording or replaying into or from a disk-like recording medium such as a CD and a DVD, and more particularly, to a so-called slot-in type disk apparatus capable of directly inserting or discharging a disk from or to outside.

BACKGROUND TECHNIQUE

A loading method is widely employed in conventional disk apparatuses. In this method, a disk is placed on a tray or a turntable, and the tray or the turntable is loaded into an apparatus body. According to such a loading method, however, since the tray or the turntable is required, there is a limit for thinning the disk apparatus body. Hence, recently, there exists a so-called slot-in type disk apparatus in which a disk is directly operated using a lever or the like by a loading motor (e.g., patent document 1).

[Patent document 2] Japanese Patent Application Laid-open No. 2002-352498

DISCLOSURE OF THE INVENTION

Problem to be Solved by the Invention

According to such a slot-in type disk apparatus, however, when a disk is inserted into and ejected from the disk apparatus, it is necessary to lower a spindle motor supported by a traverse base, and to provide a given clearance for insertion. Therefore, the traverse base which supports the spindle motor is vertically moved, but a distance for vertically moving the traverse base is required in the thickness direction of the disk apparatus. In recent years with the reduction of personal computer in size, it is also required to reduce the disk apparatus in size and thickness. When the slot-in type disk apparatus is to be reduced in thickness, it is necessary to minimize a distance required for vertically moving the traverse base.

Hence, it is an object of the present invention to provide a slot-in type disk apparatus in which the thickness of the disk apparatus is reduced, a disk can reliably be loaded on the spindle motor while securing sufficient clearance when a disk is inserted into and ejected from the disk apparatus.

Means for Solving Problem

A first aspect of the present invention provides a disk apparatus comprising a chassis outer sheath having a base body and a lid, in which a front surface of the chassis outer sheath is formed with a disk inserting opening into which a disk is directly inserted, the base body is provided with a traverse base, the traverse base is provided with a spindle motor, a pickup and drive means for moving the pickup, the disk apparatus is further provided with traverse base moving means for displacing the traverse base between the base body and the lid, wherein the spindle motor is biased toward the traverse base by a resilient member, the traverse base moving means comprises a loading motor provided on the chassis outer sheath, a slider which slides by driving of the loading motor, a traverse cam member provided on the slider, and a spindle cam member which downwardly moves the spindle motor with respect to the traverse base, the loading motor drives the spindle cam member.

According to a second aspect, in the first aspect, the slider is provided with the spindle cam member.

According to a third aspect, in the first aspect, the spindle cam member is separated from the slider and provided on the side of the traverse base.

According to a fourth aspect, in the first aspect, the spindle motor includes a plurality of pins inserted into the spindle cam member, motion of the spindle cam member driven by the loading motor is transmitted to the spindle motor through the pins to lower the spindle motor.

According to a fifth aspect, in the first aspect, the loading motor is driven to bring the spindle motor to an uppermost lifted position and then, the traverse base is lowered, and after the traverse base is lowered, the loading motor is reversely rotated to bring spindle motor to the uppermost lifted position again and then, the traverse base is lowered.

According to a sixth aspect, in the fifth aspect, before driving operation caused by reverse rotation of the loading motor, the spindle motor is actuated and a disk is rotated by a predetermined phase or predetermined time.

EFFECT OF THE INVENTION

According to the present invention, it is possible to reduce the disk apparatus in thickness and size. Especially, the spindle motor can be moved downward with respect to the traverse base. Therefore, even if the vertically moving distance of the traverse base is minimized, a clearance for inserting a disk can be secured, and the disk apparatus can further be reduced in thickness.

Figure 1:
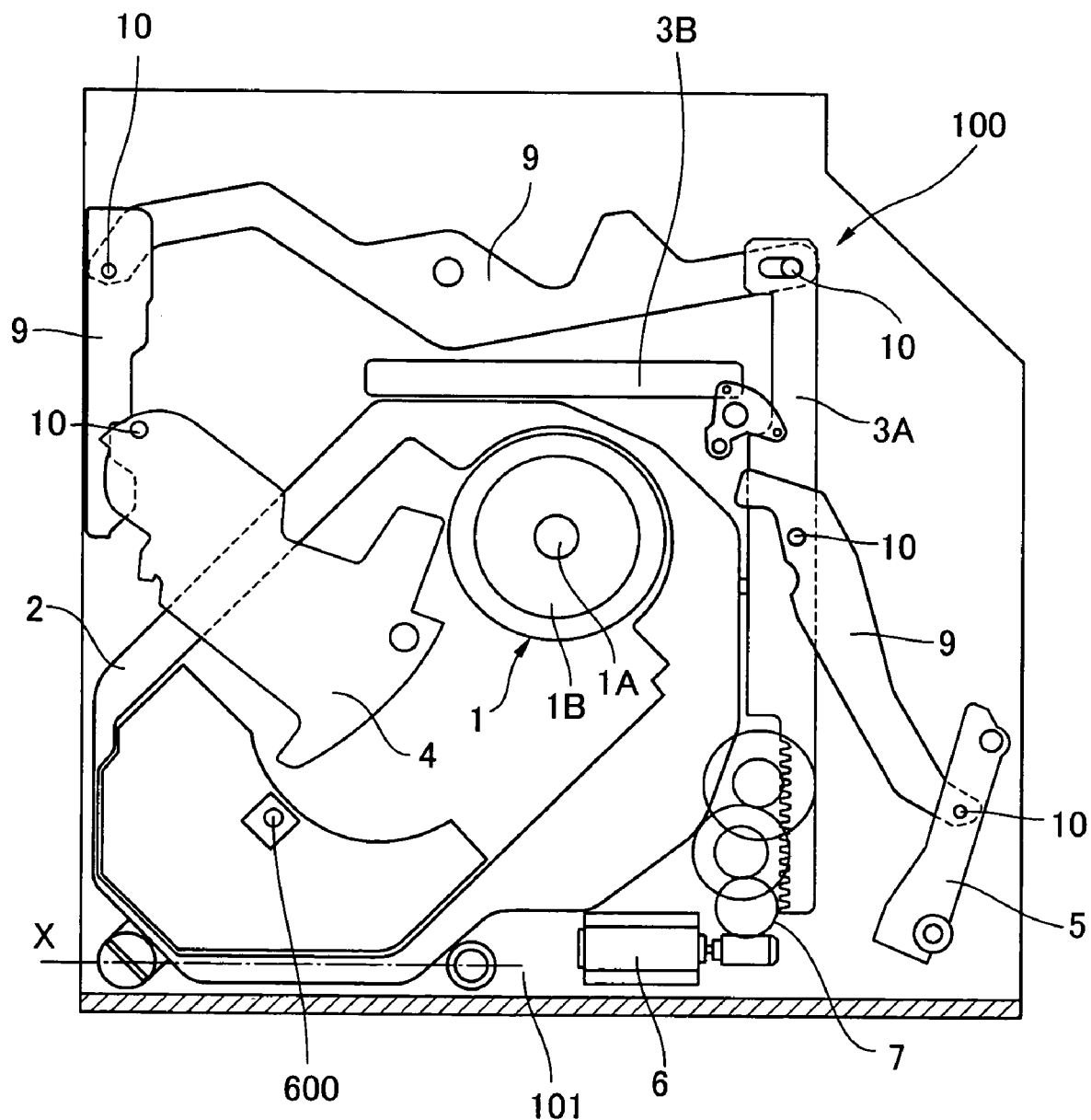
FIG. 1 is a schematic plan view of a base body of a disk apparatus according to an embodiment.

EXPLANATION OF SYMBOLS 1 spindle motor
2 traverse base
3A slider
3B slider
4 discharging lever
5 insertion lever
6 loading motor
12 spindle spring
16 spindle pin
17 traverse pin
30A spindle cam member
30B spindle cam member
40 traverse cam member
100 base body
200 lid
202 convex portion
400 disk
600 pickup

BEST MODE FOR CARRYING OUT THE INVENTION

In the disk apparatus of the first aspect of the present invention, the spindle motor is biased toward the traverse base by a resilient member, the traverse base moving means comprises a loading motor provided on the chassis outer sheath, a slider which slides by driving of the loading motor, a traverse cam member provided on the slider, and a spindle cam member which downwardly moves the spindle motor with respect to the traverse base, the loading motor drives the spindle cam member. According to this aspect, since the spindle motor can move with respect to the traverse base, the distance between the base body and the lid can be narrowed.

According to the second aspect of the invention, in the disk apparatus of the first aspect, the slider is provided with the spindle cam member. With this aspect, the slider is provided not only with the traverse cam member but also with the spindle cam member. Therefore, both the traverse cam member and spindle cam member can be provided while saving space.

According to the third aspect of the invention, in the disk apparatus of the first aspect, the spindle cam member is separated from the slider and provided on the side of the traverse base. With this aspect, since the spindle cam member and the slider are separated from each other, an adverse influence of precision error of members can be reduced, and it is possible to stably move the spindle motor vertically.

According to the fourth aspect of the invention, in the disk apparatus of the first aspect, the spindle motor includes a plurality of pins inserted into the spindle cam member, motion of the spindle cam member driven by the loading motor is transmitted to the spindle motor through the pins to lower the spindle motor. With this aspect, the spindle motor can be lowered by driving of the loading motor.

According to the fifth aspect of the invention, in the disk apparatus of the first aspect, the loading motor is driven to bring the spindle motor to an uppermost lifted position and then, the traverse base is lowered, and after the traverse base is lowered, the loading motor is reversely rotated to bring spindle motor to the uppermost lifted position again and then, the traverse base is lowered. With this aspect, it is possible to reliably carrying out the chucking by carrying out the plurality of chucking motions.

According to the sixth aspect of the invention, in the disk apparatus of the fifth aspect, before driving operation caused by reverse rotation of the loading motor, the spindle motor is actuated and a disk is rotated by a predetermined phase or predetermined time. With this aspect, when the plurality of chucking motions are carried out, the disk is rotated through a predetermined angle, thereby carrying out chucking operation reliably.

Preferred Embodiment

Figure 2:
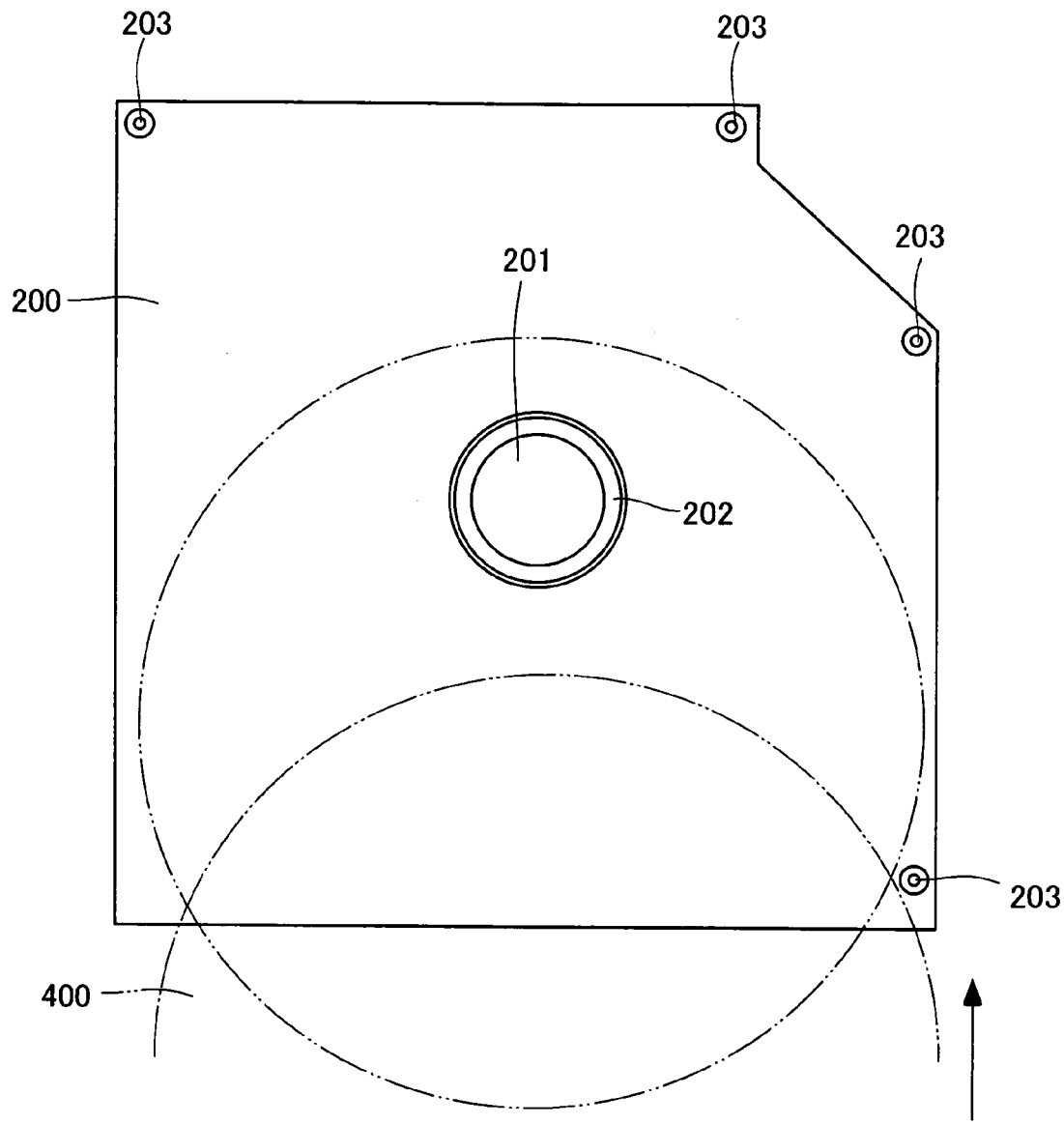
FIG. 2 is a plan view of a lid of the disk apparatus.
Figure 3:
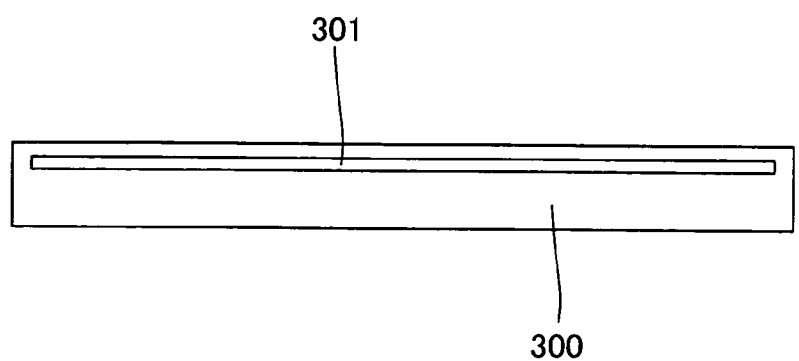
FIG. 3 is a front view of a bezel mounted on a front surface of a chassis outer sheath of the disk apparatus.

FIG. 1 is a schematic plan view of a disk apparatus according to an embodiment of the present invention from which details of a base body are omitted, FIG. 2 is a plan view of a lid of the disk apparatus, and FIG. 3 is a front view of a bezel mounted on a front surface of a chassis outer sheath of the disk apparatus.

The disk apparatus of the embodiment includes a chassis outer sheath comprising a base body 100 and a lid 200. A bezel 300 is mounted on a front surface of the chassis outer sheath. The disk apparatus of the embodiment is a slot-in type disk apparatus in which a disk is directly inserted from a disk inserting opening 301 formed in the bezel 300 shown in FIG. 3. The base body 100 is formed at its front side with an insertion space 101 corresponding to the disk inserting opening 301 into which the disk is directly inserted.

A spindle motor 1 is held by a traverse base 2 provided on the base body 100. The traverse base 2 holds a pickup 600 for recording and replaying a signal to and from a disk, and drive means (not shown) for moving the pickup 600. The traverse base 2 is rotatably supported by a phantom rotation support axis X on the side of the front side insertion space 101, and the traverse base 2 is displaced between the base body 100 and the lid 200 by traverse base moving means. The base body 100 is provided with a disk discharging lever 4 and a disk insertion lever 5. A disk is inserted and ejected by these levers 4 and 5. That is, a loading motor 6 is driven, this driving force moves sliders 3A and 3B through a gear group 7, and the disk is inserted and ejected by a known mechanism comprising links 9 and pins 10 connected to the slider 3A.

FIG. 2 shows the lid 200. The lid 200 is provided with a convex portion 202 at a location of the lid 200 opposed to a rotation stage 1B of the spindle motor 1 shown in FIG. 1 such that the convex portion 202 projects toward the rotation stage 1B. An outer edge of the lid 200 is provided with a plurality of screw holes 203, and the lid 200 is mounted on the base body 100 by screws. The lid 200 is provided at its central portion (this is also a central portion of the convex portion 202) with an opening 201. This opening 201 is a circular opening having a radius greater than a center hole of the disk 400. Therefore, the opening 201 is greater than a hub 1A (see FIG. 1) of the spindle motor 1 which is fitted into the center hole of the disk 400.

Next, traverse base moving means for displacing the traverse base 2 will be explained.

Figure 4:
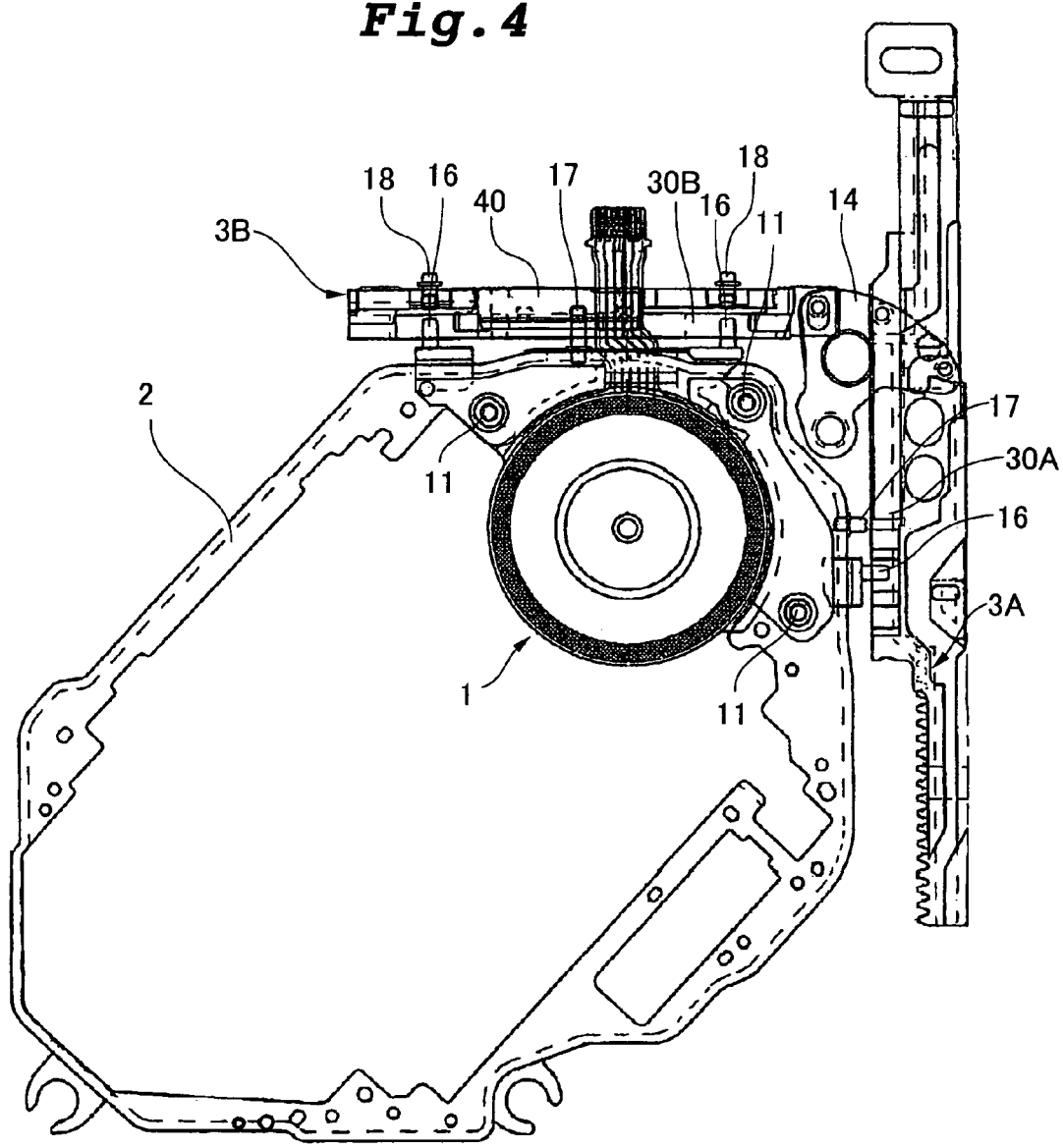
FIG. 4 is a plan view of an essential portion of the disk apparatus.
Figure 5:
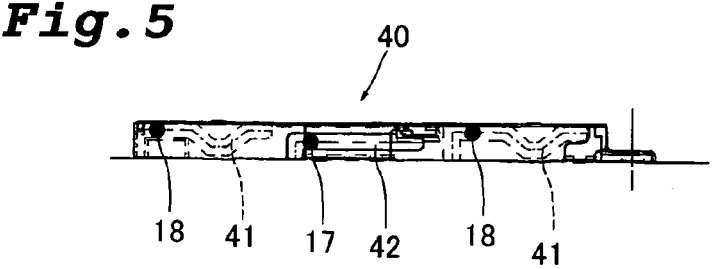
FIG. 5 is a side view of a traverse cam member showing a loading/ejecting state.
Figure 6:
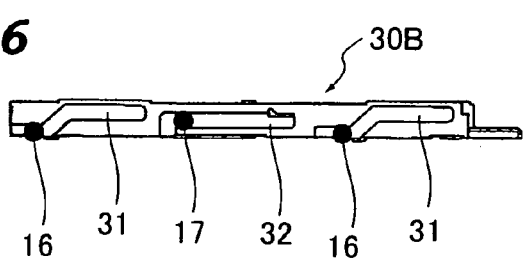
FIG. 6 is a side view of a spindle cam member showing the above state.

FIG. 4 is a plan view of an essential portion of the disk apparatus, and shows the traverse base 2 and the sliders 3A and 3B. FIG. 5 is a side view of a traverse cam member. FIG. 6 is a side view of a spindle cam member.

The spindle motor 1 is supported by three support portions 11 so that the spindle motor 1 can independently vertically move with respect to the traverse base 2. In the support portions 11 provided on the traverse base 2, the spindle motor 1 is biased toward the traverse base 2 by a spindle spring 12 (see FIGS. 7 to 11), and is normally abutted against the traverse base 2. The traverse base moving means comprises the loading motor 6 provided on the base body 100, the spindle cam member 30A provided on the slider 3A which slides when the loading motor 6 drives, and the spindle cam member 30B provided on the slider 3B. The slider 3A and the slider 3B are connected to each other through the connecting lever 14, and the slider 3B is operated together with the slider 3A.

The slider 3B is provided with a traverse cam member 40. The traverse cam member 40 is provided with base cams 41 on which base pins 18 fixed to the base body 100 slide, and a traverse cam 42 on which a traverse pin 17 provided on the traverse base 2 slides.

The spindle cam member 30B and the traverse cam member 40 move in the horizontal direction together with the slider 3B, and move in the vertical direction with respect to the slider 3B by the base pin 18. The spindle pin 16 slides in a spindle cam 31 of the spindle cam member 30B. The traverse pin 17 slides in a traverse cam 32 of the spindle cam member 30B and in the traverse cam 42 of the traverse cam member 40.

If the sliders 3A and 3B are moved by the loading motor 6, the spindle cam members 30A and 30B and the traverse cam member 40 are driven.

Although the traverse base moving means comprises the spindle cam members 30A and 30B and the traverse cam member 40 in this embodiment, one cam member may have functions of a plurality of cam members, or the traverse base moving means may comprise more cam members.

More detailed structure and motion of the disk apparatus will be explained using FIGS. 5 to 19.

Figure 7:
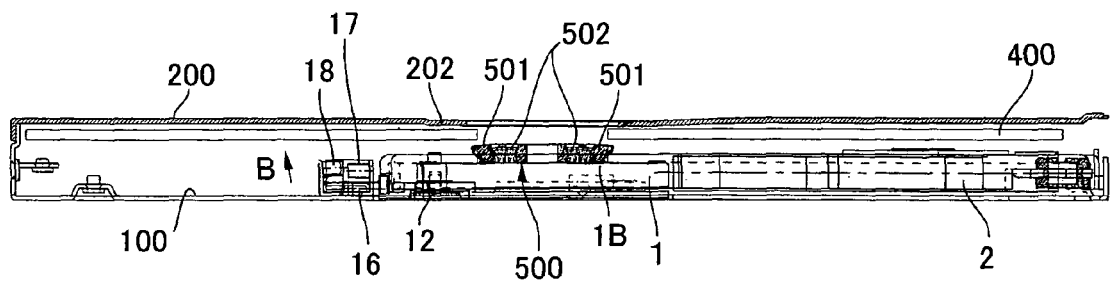
FIG. 7 is a side view of an essential portion of the disk apparatus showing the above state.

FIGS. 5 to 7 show the loading/ejecting state, and FIG. 7 is a side view of an essential portion of the disk apparatus.

Figure 8:
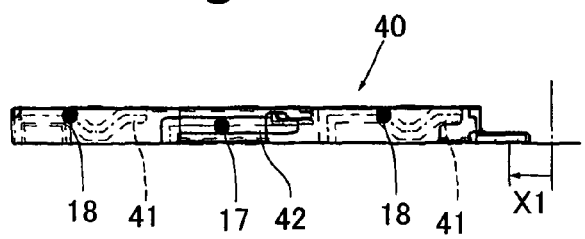
FIG. 8 is a side view of a traverse cam member showing a state where the spindle motor moves upward.
Figure 9:
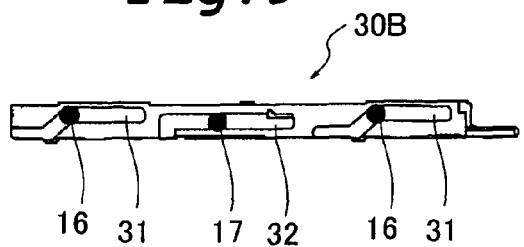
FIG. 9 is a side view of the spindle cam member showing the above state.
Figure 10:
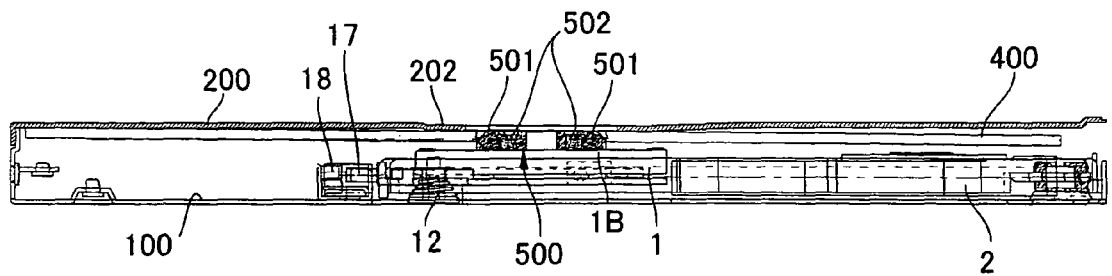
FIG. 10 is a side view of an essential portion of the disk apparatus showing the above state.

FIGS. 8 to 10 show a state where the spindle motor moved upward, FIG. 8 is a side view of the traverse cam member, FIG. 9 is a side view of the spindle cam member, and FIG. 10 is a side view of an essential portion of the disk apparatus.

Figure 11:
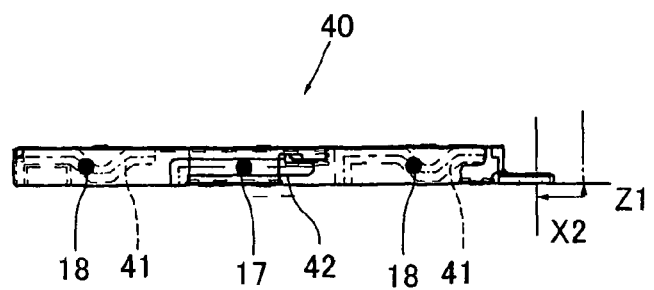
FIG. 11 is a side view of the traverse cam member showing a chucking state.
Figure 12:
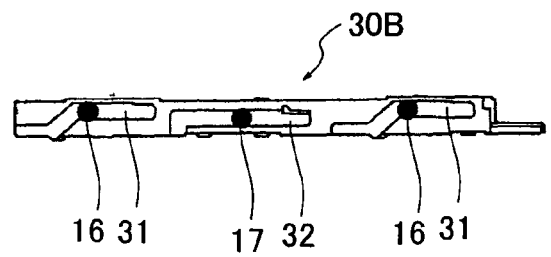
FIG. 12 is a side view of the spindle cam member showing the above state.
Figure 13:
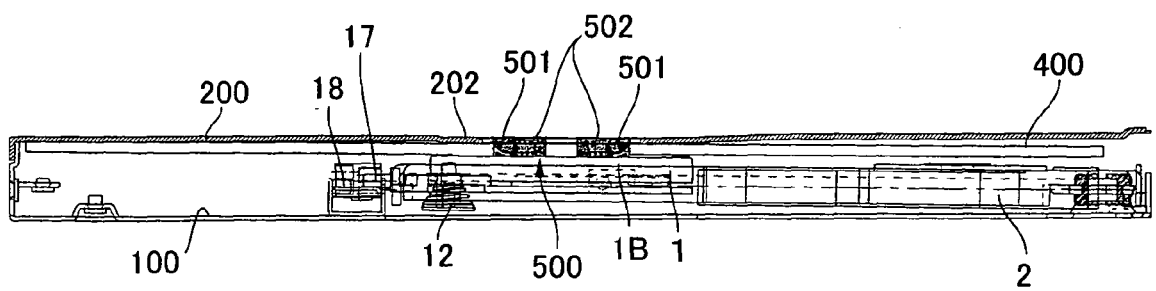
FIG. 13 is a side view of an essential portion of the disk apparatus showing the above state.

FIGS. 11 to 13 show a chucking state. FIG. 11 is a side view of the traverse cam member, FIG. 12 is a side view of the spindle cam member, and FIG. 13 is a side view of an essential portion of the disk apparatus.

Figure 14:
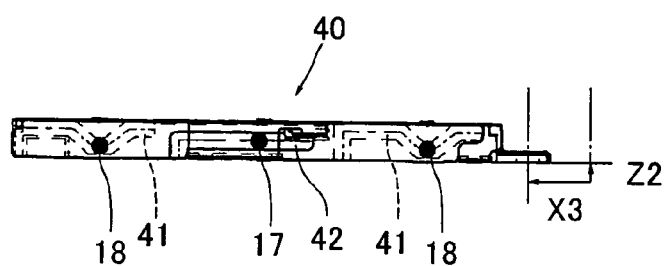
FIG. 14 is a side view of the traverse cam member showing the uppermost lifted position in the chucking.
Figure 15:
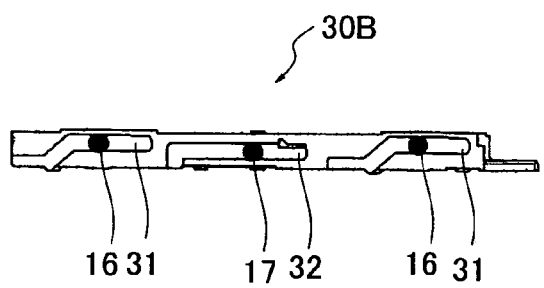
FIG. 15 is a side view of the spindle cam member showing the above state.
Figure 16:
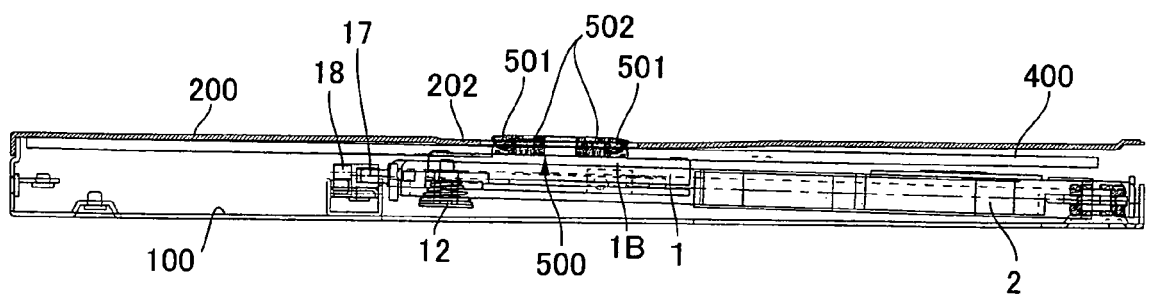
FIG. 16 is a side view of an essential portion of the disk apparatus showing the above state.

FIGS. 14 to 16 show the uppermost lifted position in the chucking. FIG. 14 is a side view of the traverse cam member, FIG. 15 is a side view of the spindle cam member and FIG. 16 is a side view of an essential portion of the disk apparatus.

Figure 17:
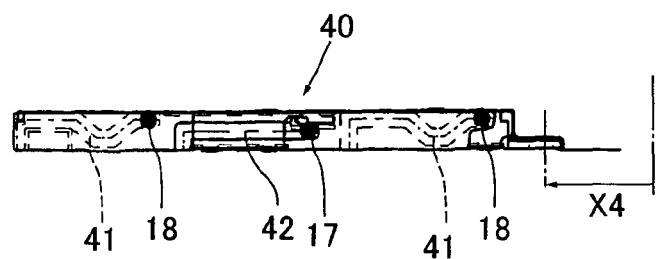
FIG. 17 is a side view of the traverse cam member showing a recording/replaying state.
Figure 18:
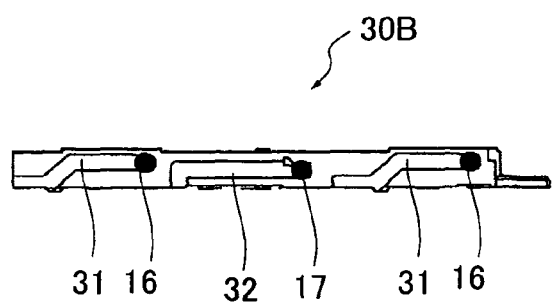
FIG. 18 is a side view of the spindle cam member showing the above state.
Figure 19:
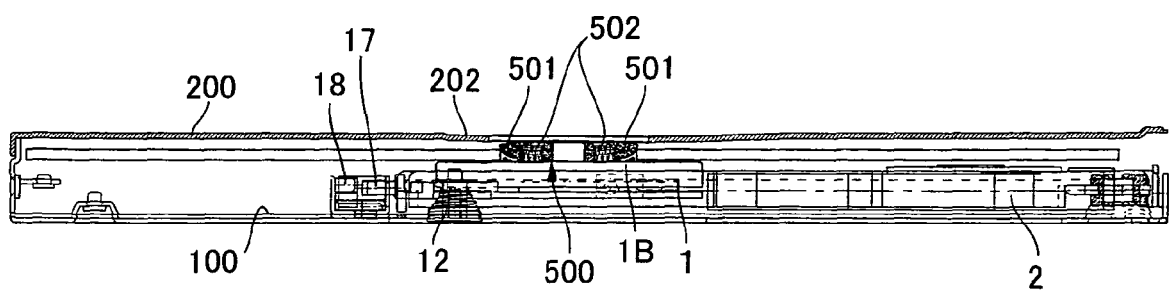
FIG. 19 is a side view of an essential portion of the disk apparatus showing the above state.

FIGS. 17 to 19 show a recording/replaying state. FIG. 17 is a side view of the traverse cam member, FIG. 18 is a side view of the spindle cam member, and FIG. 19 is a side view of an essential portion of the disk apparatus.

FIGS. 5 to 19 show various states of loading motion of the disk 400 on the spindle motor 1. The traverse base 2 is displaced around the front side rotation support axis X in a direction in which the spindle motor 1 approaches to the lid 200 after the disk 400 is inserted. In a state where the spindle Motor 1 is moved in a direction in which the spindle motor 1 comes closest to the lid 200 (shown in FIGS. 8 to 10), the disk 400 abuts against the lid 200, the disk 400 is sandwiched between the lid 200 and the spindle motor 1, and the disk 400 is loaded on the spindle motor 1 by a disk holding mechanism 500 provided on the rotation stage 1B of the spindle motor 1.

The disk holding mechanism 500 includes holding pawls 501 and resilient members 502. The disk holding mechanism 500 has a first state where the holding pawls 501 hold the disk 400 such that the disk 400 can rotate in unison with the spindle motor 1, and a second state which is different from the first state where the disk 400 is located higher than the holding pawls 501 and the disk 400 is not loaded on the spindle motor 1 by the disk holding mechanism 500.

First, as shown in FIGS. 5 to 7, in the loading/ejecting state, the disk 400 is disposed above the spindle motor 1 (the disk holding mechanism 500 is in the second state), or a space in which the disk 400 can be disposed is formed. At that time, the traverse cam member 40 and the spindle cam member 30B are closest to the slider 3A. In this state, as shown in FIG. 5, the traverse cam member 40 is located at the lowest position with respect to the base pins 18. As shown in FIG. 6, the spindle pins 16 are in the spindle cam 31 which is located at the lowest position with respect to the spindle cam member 30B. Therefore, the traverse base 2 is located at a position closest to the base body 100 as shown in FIG. 7, and the spindle motor 1 is also located at a position closest to the base body 100.

In a state where the disk 400 is disposed above the spindle motor 1, the upward motion of the spindle motor 1 is started.

FIG. 8 shows a state where the traverse cam member 40 moves in the horizontal direction by a predetermined distance X1. In the state shown in FIG. 8, since the base pins 18 are disposed in the base cams 41 having the same height as that shown in FIG. 5, the traverse base 2 maintains its position closest to the base body 100. On the other hand, since the spindle pins 16 move upward in the spindle cams 31 as shown in FIG. 9, the spindle motor 1 moves in a direction separating away from the base body 100. If the spindle motor 1 moves upward in this manner, the disk holding mechanism 500 abuts against the disk 400 as shown in FIG. 10.

FIG. 11 shows a state where the traverse cam member 40 moves in the horizontal direction by a predetermined distance X2. In the state shown in FIG. 11, since the base pins 18 are disposed in the base cam 41 having the lower position than that shown in FIG. 5, the traverse cam member 40 moves in the vertical direction by a predetermined height Z1. On the other hand, as shown in FIG. 12, the spindle pins 16 are in the spindle cam 31 having the same height as that shown in FIG. 9, the traverse cam member 40 and the spindle cam member 30B are held at the same height by the traverse pin 17 and thus, the spindle motor 1 moves in the vertical direction by a predetermined height Z1. If the spindle motor 1 moves upward together with the traverse base 2 in this manner, the chucking motion as shown in FIG. 13 is carried out.

FIG. 14 shows a state where the traverse cam member 40 moves in the horizontal direction by a predetermined distance X3. In the state shown in FIG. 14, since base pins 18 are disposed in the base cam 41 moving the lower position than that shown in FIG. 11, the traverse cam member 40 moves in the vertical direction by a predetermined height Z2. On the other hand, as shown in FIG. 15, the spindle pins 16 are in the spindle cam 31 having the same height as that shown in FIG. 12, the traverse cam member 40 and the spindle cam member 30B are held at the same height by the traverse pins 17 and thus, the spindle motor 1 moves in the vertical direction by a predetermined height Z2. If the spindle motor 1 moves upward together with the traverse base 2 in this manner, the spindle motor 1 rises to the uppermost lifted position as shown in FIG. 16, the convex portion 202 of the lid 200 abuts against the disk 400, the disk 400 is pushed back by a reaction force by the convex portion 202, the disk 400 is pushed toward the disk holding mechanism 500, the state of the disk holding mechanism 500 is brought into the first state from the second state, and the chucking motion is completed.

FIG. 17 shows a state where the traverse cam member 40 moves in the horizontal direction by a predetermined distance X4. In the state shown in FIG. 17, since base pins 18 are disposed in the base cam 41 having the same height as that shown in FIG. 5 again, the traverse cam member 40 moves downward in the vertical direction by a predetermined height Z2. On the other hand, as shown in FIG. 18, spindle pins 16 are in the spindle cam 31 having the same height as that shown in FIG. 15, the traverse cam member 40 and the spindle cam member 30B are held at the same height by the traverse pin 17 and thus, the spindle motor 1 moves downward in the vertical direction by the predetermined height Z2. If the spindle motor 1 moves downward together with the traverse base 2 in this manner, the convex portion 202 of the lid 200 does not abut against the disk 400 as shown in FIG. 19. A lower surface of the convex portion 202 of the lid 200 is provided with a protection film such as urethane coating so that the disk 400 is not damaged. Of the above states, the states shown in FIGS. 16 and 19 where the disk 400 is completely held by the disk holding mechanism 500 are the first state, and other states are the second state.

The ejecting motion is the reverse of the above motion by reversely rotating the loading motor 6 (see FIG. 1). That is, the traverse cam member 40 moves through the states shown in FIGS. 14, 11, 8 and 5 in this order from the state shown in FIG. 17, and the spindle cam member 30B moves through the states shown in FIGS. 15, 12, 9 and 6 in this order from the state shown in FIG. 18.

In the state shown in FIG. 7, the spindle motor 1 is relatively lowered by the traverse base 2 against a force of the spindle spring 12. By moving downward the spindle motor 1 with respect to the traverse base 2, even if the vertically moving distance of the traverse base 2 is minimized, a space into which the disk 400 is inserted (clearance into which the disk is inserted) can sufficiently be secured between the lid 200 and the traverse base 2. Therefore, the entire disk apparatus can be reduced in thickness.

Next, another loading motion of the disk apparatus will be explained.

From the loading/ejecting state shown in FIGS. 5 to 7, the spindle motor 1 is moved upward as shown in FIGS. 8 to 10, the spindle motor 1 is moved to the uppermost lifted position in chucking shown in FIGS. 14 to 16 through the states shown in FIGS. 11 to 13, and the traverse base 2 is moved downward as shown in FIGS. 17 to 19.

After these motions are completed, the spindle motor 1 is actuated, and the disk 400 is rotated by a predetermined phase or predetermined times.

After the disk 400 is rotated by a predetermined phase or predetermined times, the spindle motor 1 is stopped, the loading motor 6 (see FIG. 1) is reversely rotated, and the procedure is brought into the states shown in FIGS. 11 to 13 from the states shown in FIGS. 17 to 19 through the states which the uppermost lifted position in the chucking shown in FIGS. 14 to 16, and the rotation of the loading motor 6 (see FIG. 1) is stopped.

After these motions are completed, the spindle motor 1 is again actuated, and the disk 400 is rotated by a predetermined phase or predetermined times.

After the disk 400 is rotated by a predetermined phase or predetermined times, the spindle motor 1 is stopped, the loading motor 6 (see FIG. 1) is normally rotated, and the procedure is brought into the state which the uppermost lifted position in the chucking shown in FIGS. 14 to 16 from the states shown in FIGS. 11 to 13, and the traverse base 2 is moved downward as shown in FIG. 17 to 19.

With the above motions, the loading motion is completed.

After the loading motion is carried out once in this manner, the loading motor 6 (see FIG. 1) is reversely rotated such as to pass through the uppermost lifted position in the chucking, and the loading motor 6 (see FIG. 1) is normally rotated such as to pass through the uppermost lifted position again. With this, even if chucking is not normally carried out with one loading motion, since the loading motor passes through the uppermost lifted position second time or third time, chucking can be carried out. Especially, when a plurality of chucking motions are carried out, the disk 400 is rotated and thus, more reliably chucking can be carried out.

Next, another embodiment will be explained using FIGS. 20 to 27.

Figure 20:
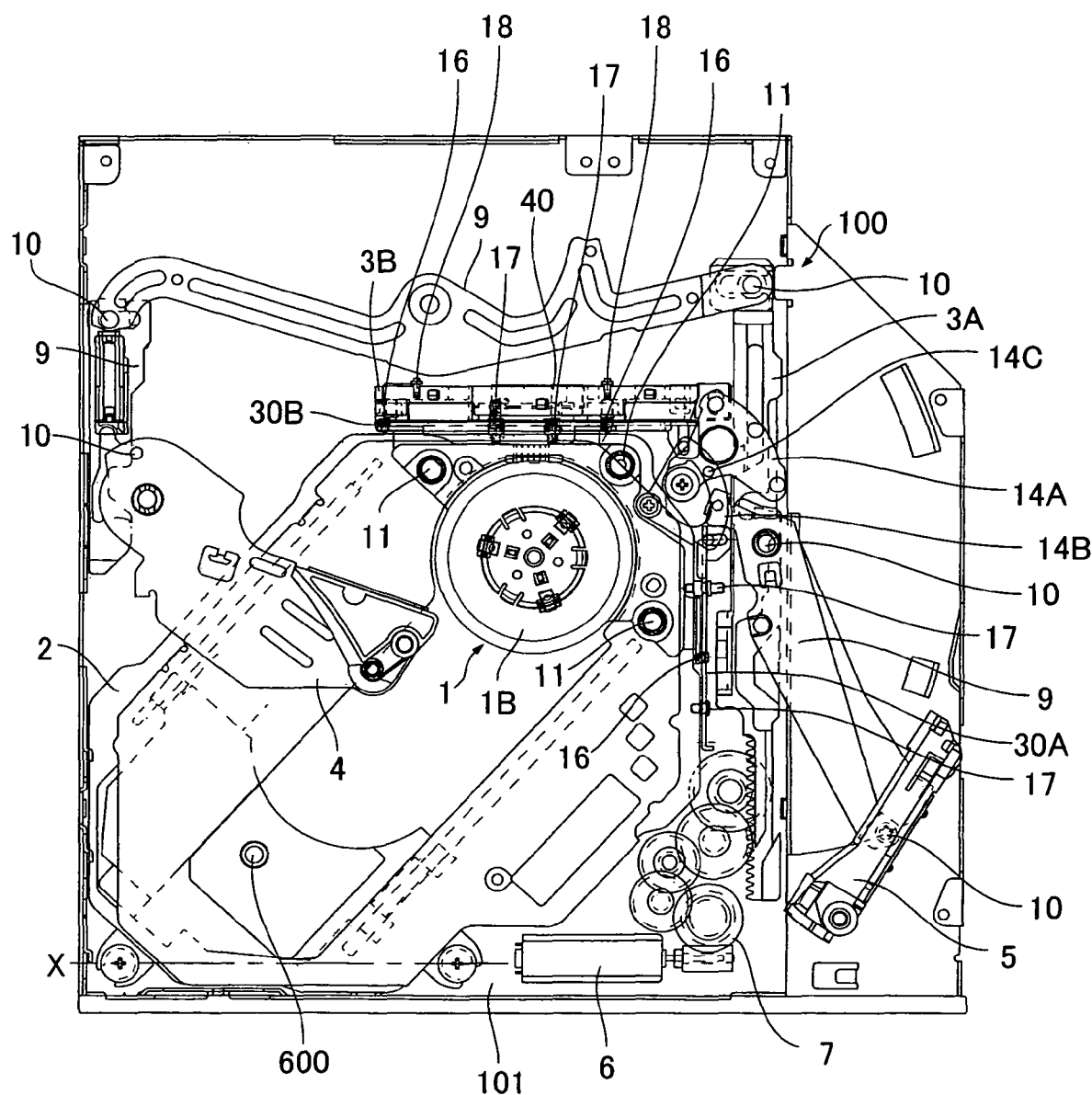
FIG. 20 is a schematic plan view of a disk apparatus of another embodiment of the present invention.
Figure 21:
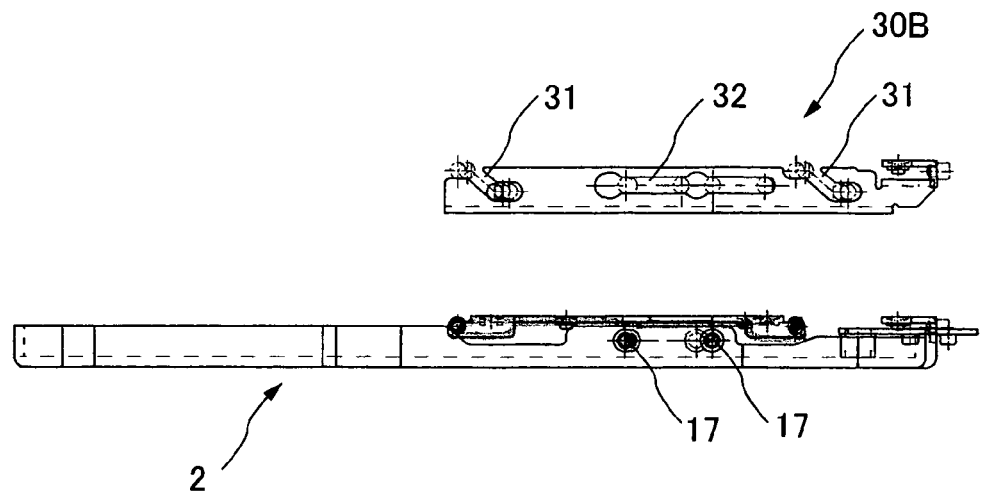
FIG. 21 is an exploded side view of a traverse base 2 and a spindle cam member 30B as viewed from a slider 3B of the disk apparatus.
Figure 22:
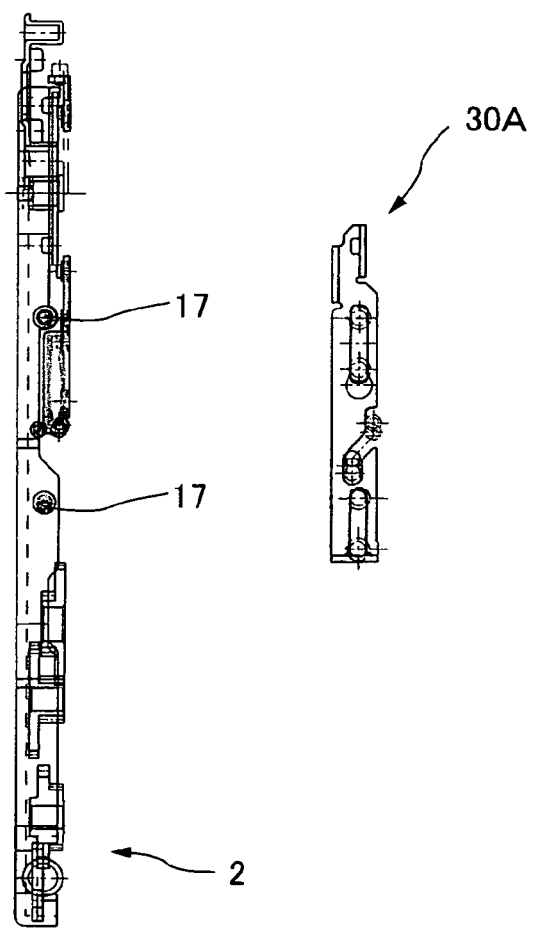
FIG. 22 is an exploded side view of the traverse base 2 and a spindle cam member 30A as viewed from a slider 3A of the disk apparatus.

FIG. 20 is a schematic plan view of a disk apparatus of another embodiment of the present invention. FIG. 21 is an exploded side view of a traverse base 2 and a spindle cam member 30B as viewed from a slider 3B of the disk apparatus. FIG. 22 is an exploded side view of the traverse base 2 and a spindle cam member 30A as viewed from a slider 3A of the disk apparatus. FIGS. 23 to 27 are side views of a spindle cam member 30B. Members having the same functions are designated with the same symbols as those of the above embodiment, and explanation thereof will be omitted.

In this embodiment, the slider 3B is provided with the traverse cam member 40, the spindle cam member 30B is separated from the slider 3B and is provided on the side of the traverse base 2.

That is, the traverse cam member 40 moves in the horizontal direction together with the slider 3B and moves in the vertical direction with respect to the slider 3B by the base pins 18 fixed to the base body 100. The slider 3A and the slider 3B are connected to each other through the connecting lever 14, and the slider 3B is operated together with the slider 3A.

On the other hand, motion of the slider 3A is transmitted to the spindle cam members 30A and 30B by a first connecting lever 14A and a second connecting lever 14B, and the spindle cam members 30A and 30B moves in the horizontal direction. The spindle cam members 30A and 30B moves in a vertical direction with respect to the traverse base 2 by the spindle pin 16 fixed to the spindle motor 1. The spindle cam member 30A and the spindle cam member 30B are connected to each other through a second connecting lever 14, and the spindle cam member 30B is operated together with the spindle cam member 30A. The second connecting lever 14B is connected to the first connecting lever 14A and a connecting pin 14C, and is operated by the first connecting lever 14A. The spindle cam member 30A and the spindle cam member 30B may be operated by the slider 3A without connecting the second connecting lever 14B and the first connecting lever 14A to each other.

Motion of the disk apparatus will be explained using FIGS. 23 to 27.

Figure 23:
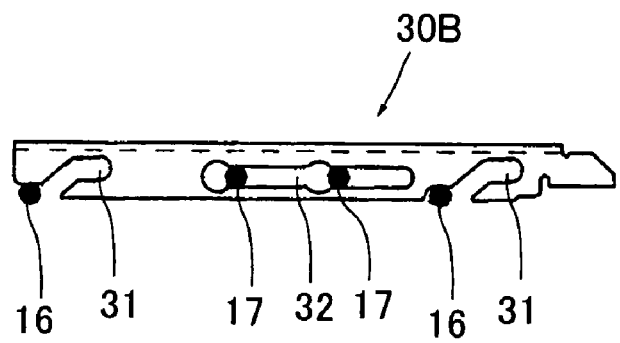
FIG. 23 is a side view of the spindle cam member showing a loading/ejecting state.
Figure 24:
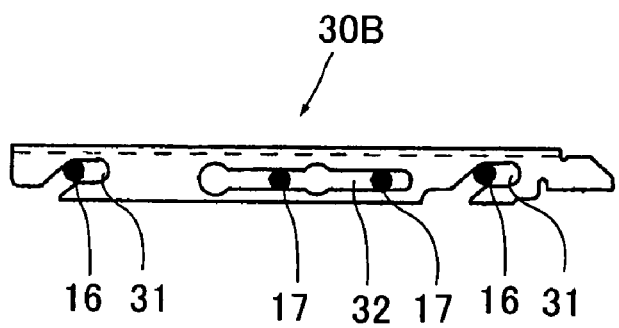
FIG. 24 is a side view of the spindle cam member showing a state where the spindle motor of the disk apparatus moves upward.
Figure 25:
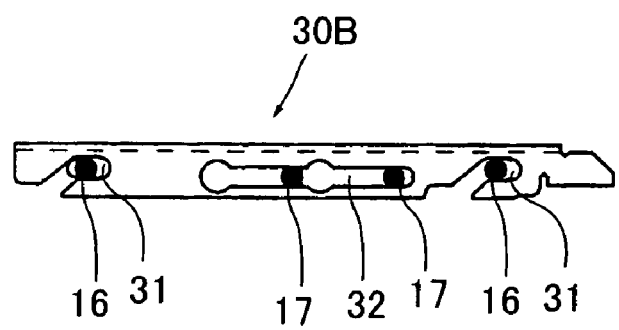
FIG. 25 is a side view of the spindle cam member showing a chucking state of the disk apparatus.
Figure 26:
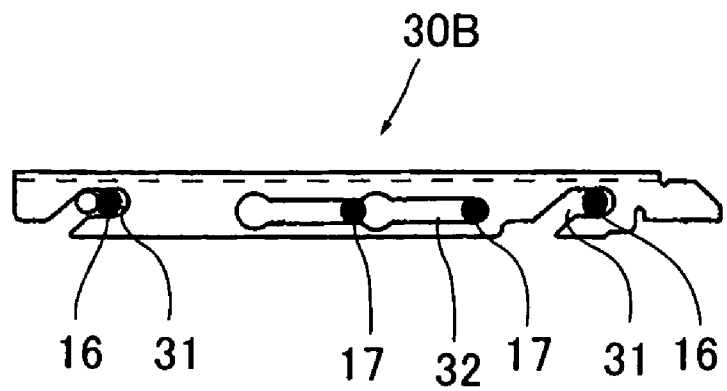
FIG. 26 is a side view of the spindle cam member showing the uppermost lifted position in the chucking of the disk apparatus.
Figure 27:
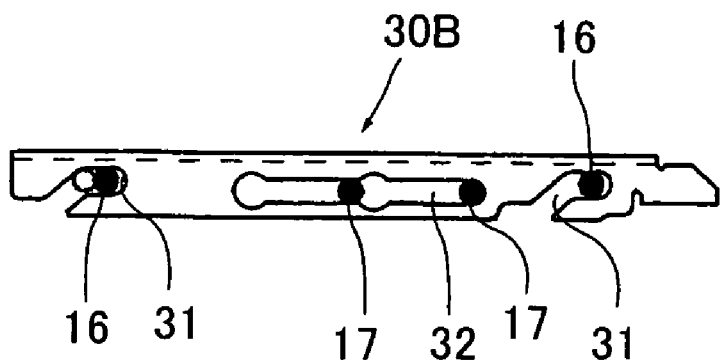
FIG. 27 is a side view of the spindle cam member showing a recording/replying state of the disk apparatus.

FIG. 23 shows a loading/ejecting state, FIG. 24 shows a state where the spindle motor moves upward, FIG. 25 shows a chucking state, FIG. 26 shows the uppermost lifted position in chucking, and FIG. 27 shows the recording/replying state. FIG. 23 corresponds to FIG. 6, FIG. 24 corresponds to FIG. 9, FIG. 25 corresponds to FIG. 12, FIG. 26 corresponds to FIG. 15, and FIG. 27 corresponds to FIG. 18. Since the movements of the traverse cam member 40 and traverse base 2 are same as those shown in FIGS. 5 to 19, explanation thereof will be omitted.

First, the spindle cam member 30B in FIG. 23 is in a position closest to the slider 3A. In this state, as shown in FIG. 23, the spindle pins 16 are in the spindle cam 31 which is located at the lowest position with respect to the spindle cam member 30B. Therefore, the traverse base 2 is located at a position closest to the base body 100, and the spindle motor 1 is also located at a position closest to the base body 100.

In a state shown in FIG. 24, the spindle pins 16 move upward in the spindle cam 31, the spindle motor 1 moves in a direction separating away from the base body 100. If the spindle motor 1 moves upward in this manner, the disk holding mechanism 500 abuts against the disk 400.

In a state shown in FIG. 25, the spindle pins 16 are in the spindle cam 31 having the same height as that shown in FIG. 24, the traverse cam member 40 and the spindle cam member 30B are held at the same height by the traverse pins 17 and thus, the spindle motor 1 moves in the vertical direction by a predetermined height Z1. If the spindle motor 1 moves upward together with the traverse base 2 in this manner, the chucking motion is carried out.

In a state shown in FIG. 26, spindle pins 16 are in the spindle cam 31 having the same height as that shown in FIG. 25, the traverse cam member 40 and the spindle cam member 30B are held at the same height by the traverse pins 17 and thus, the spindle motor 1 moves in the vertical direction by a predetermined height Z2. If the spindle motor 1 moves upward together with the traverse base 2 in this manner, the spindle motor 1 rises to the uppermost lifted position, and the chucking motion is completed.

In a state shown in FIG. 27, spindle pins 16 are in the spindle cam 31 having the same height as that shown in FIG. 26, the traverse cam member 40 and the spindle cam member 30B are held at the same height by the traverse pins 17 and thus, the spindle motor 1 moves downward in the vertical direction by the predetermined height Z2. If the spindle motor 1 moves downward together with the traverse base 2 in this manner, the convex portion 202 of the lid 200 does not abut against the disk 400.

According to this embodiment, the spindle cam members 30A and 30B are separated from the sliders 3A and 3B. Therefore, adverse influence of precision error of members is reduced, and vertical motion of the spindle motor 1 can stably be carried out.

INDUSTRIAL APPLICABILITY

The present invention can be utilized for a disk apparatus for recording or replaying into or from a disk-like recording medium such as a CD and a DVD, which is used as a domestic video apparatus or a peripheral device for a computer, which is required to be thin, in which even if the movement of a traverse base for reliably loading a disk on a spindle motor is minimized, it is possible to secure a space in which the disk is reliably automatically attached.

The invention claimed is:

1. A disk apparatus comprising:
   a base body,
   a traverse base provided on said base body,
   a spindle motor held by said traverse base and configured for rotating a disk,
   a loading motor provided on said base body,
   a traverse cam member for displacing a location of said traverse base with respect to said base body,
   a spindle cam member for displacing a location of said spindle motor with respect to said traverse base, wherein:
   said spindle motor is biased toward said traverse base by a resilient member,
   in order to position a disk loaded on the disk apparatus to a recording/replaying position, said loading motor moves said traverse cam member and said spindle cam member correlatively in the horizontal direction, and said traverse base and said spindle motor are moved upward and downward,
   the disk apparatus is a slot-in type configured to directly insert or discharge a disk from or to the outside,
   said traverse base and said spindle motor are positioned closest to said base body,
   said spindle motor moves upward in the direction separating away from said base body,
   said traverse base moves upward by maintaining distance between said traverse base and said spindle motor, and
   said traverse base moves downward by maintaining distance between said traverse base and said spindle motor.

2. The disk apparatus according to claim 1, wherein a slider is provided with said spindle cam member.

3. The disk apparatus according to claim 1, wherein said spindle cam member is provided on a side of said traverse base.

4. The disk apparatus according to claim 1, wherein said spindle motor includes a plurality of pins inserted into said spindle cam member, and motion of said spindle cam member driven by said loading motor is transmitted to said spindle motor through said pins to lower said spindle motor.

5. The disk apparatus according to claim 1, wherein said loading motor is driven to bring said spindle motor to an uppermost lifted position and then, said traverse base is lowered, and after said traverse base is lowered, said loading motor is reversely rotated to bring the spindle motor to the uppermost lifted position again and then, said traverse base is lowered.

6. The disk apparatus according to claim 5, wherein prior to a driving operation caused by reverse rotation of said loading motor, said spindle motor is actuated and a disk is rotated by a predetermined phase or predetermined time.

* * * * *